US009735646B2

(12) United States Patent
Johnson et al.

(10) Patent No.: US 9,735,646 B2
(45) Date of Patent: Aug. 15, 2017

(54) INJECTION MOLDED BLANK FOR LEAD SCREW, ROTOR-BLANK ASSEMBLY AND METHOD FOR PRODUCING SAME

(71) Applicant: Thomson Industries, Inc., Amherst, NY (US)

(72) Inventors: Jeffrey G. Johnson, Carpentersville, IL (US); Robert A. Lipsett, San Jose, CA (US)

(73) Assignee: Thomson Industries, Inc., Amherst, NY (US)

( * ) Notice: Subject to any disclaimer, the term of this patent is extended or adjusted under 35 U.S.C. 154(b) by 0 days.

(21) Appl. No.: 14/911,818

(22) PCT Filed: Jul. 21, 2014

(86) PCT No.: PCT/US2014/047387
§ 371 (c)(1),
(2) Date: Feb. 12, 2016

(87) PCT Pub. No.: WO2015/023398
PCT Pub. Date: Feb. 19, 2015

(65) Prior Publication Data
US 2016/0204672 A1    Jul. 14, 2016

Related U.S. Application Data

(60) Provisional application No. 61/866,958, filed on Aug. 16, 2013.

(51) Int. Cl.
*H02K 7/10*    (2006.01)
*F16H 25/24*    (2006.01)
(Continued)

(52) U.S. Cl.
CPC ............... *H02K 7/10* (2013.01); *F16H 25/24* (2013.01); *H02K 7/003* (2013.01); *H02K 7/06* (2013.01); *H02K 7/116* (2013.01); *H02K 15/02* (2013.01); *F16H 2025/2078* (2013.01); *F16H 2025/249* (2013.01)

(58) Field of Classification Search
CPC ......... F16H 25/24; F16H 25/20; H02K 7/116; H02K 15/02; H02K 7/06; H02K 7/10; H02K 7/003; H02K 37/00
USPC ........... 310/60 A, 61, 12.01, 156.09, 156.13, 310/216.123, 402
See application file for complete search history.

(56) References Cited

U.S. PATENT DOCUMENTS 2,060,260 A * 11/1936 Spengler ............... H02K 1/2733
29/598
3,571,921 A *  3/1971 Pieper .................... H02K 15/16
29/419.2
(Continued)

FOREIGN PATENT DOCUMENTS

DE          24 06 201        8/1975

*Primary Examiner* — Naishadh Desai
(74) *Attorney, Agent, or Firm* — Dilworth & Barrese, LLP

(57) ABSTRACT

A motor rotor-blank assembly for a motor is provided. The rotor-blank assembly includes a rotor including a plurality of rotor anti-rotation features; and a blank having a hollow core and including a plurality of blank anti-rotation features corresponding to the rotor anti-rotation features, wherein the rotor anti-rotation features and the blank anti-rotation features work in conjunction to maintain the blank fixed within the rotor during rotation of the rotor.

18 Claims, 4 Drawing Sheets

(51) Int. Cl.
*H02K 7/00* (2006.01)
*H02K 15/02* (2006.01)
*H02K 7/116* (2006.01)
*H02K 7/06* (2006.01)
*F16H 25/20* (2006.01)

(56) References Cited

U.S. PATENT DOCUMENTS

| | | | | |
|---|---|---|---|---|
| 4,060,745 | A * | 11/1977 | Linscott, Jr. | H02K 1/2733 310/156.09 |
| 4,358,700 | A * | 11/1982 | Nottingham | H02K 3/51 310/262 |
| 5,704,111 | A * | 1/1998 | Johnson | H02K 1/30 29/451 |
| 6,774,517 | B2 | 8/2004 | Kowalski et al. | |
| 7,737,592 | B2 * | 6/2010 | Makino | H02K 1/276 310/156.09 |
| 8,035,273 | B2 * | 10/2011 | Ionel | H02K 1/22 310/156.08 |
| 8,080,907 | B2 * | 12/2011 | Jeung | H02K 1/2733 310/156.08 |
| 8,169,111 | B2 * | 5/2012 | Yoshimura | H02K 29/12 310/216.121 |
| 8,899,120 | B2 * | 12/2014 | Nakamura | F16H 25/2238 310/80 |
| 2002/0117926 | A1 * | 8/2002 | Joong | B61C 9/48 310/191 |
| 2005/0225190 | A1 * | 10/2005 | Kinashi | H02K 1/2733 310/156.13 |
| 2006/0213297 | A1 | 9/2006 | Blum | |
| 2006/0284506 | A1 * | 12/2006 | Kim | H02K 1/2733 310/156.13 |
| 2009/0115263 | A1 * | 5/2009 | Ihara | B60K 6/26 310/96 |
| 2010/0066189 | A1 * | 3/2010 | Horng | H02K 1/28 310/156.09 |
| 2010/0289358 | A1 * | 11/2010 | Sorida | H02K 7/116 310/83 |
| 2010/0308671 | A1 * | 12/2010 | Ryan | H02K 1/2733 310/43 |

* cited by examiner

SECTION B-B

INJECTION MOLDED BLANK FOR LEAD SCREW, ROTOR-BLANK ASSEMBLY AND METHOD FOR PRODUCING SAME

PRIORITY

This application claims the benefit of U.S. Provisional Application No. 61/866,958, filed Aug. 16, 2013, the contents of which are incorporated herein by reference.

TECHNICAL FIELD

The present invention relates generally to linear actuators and, more particularly, to a rotor-blank assembly in a motor.

BACKGROUND

Linear actuators create motion in a straight line, in contrast to the circular motion of a conventional electric motor. Such actuators are designed for use where a motor drives a threaded shaft and a corresponding threaded coupled nut such that rotary motion of a control knob or handle is converted into a linear displacement via screws, gears or other similar devices. Most electro-mechanical linear actuator designs incorporate a lead screw and lead nut. Balls screws and ball nuts also may be used. In both instances the screw may be connected to a motor or manual control knob either directly or through a series of gears. Gears are typically used to allow a relatively small motor spinning at a higher rotational speed to be geared down to provide the torque necessary to spin the screw under a heavier load than the motor would otherwise be capable of driving directly.

Presently there exist at least two methods of integrating a lead nut into a motor rotor. In one method, an injection molding technique is used where a threaded lead nut is injection molded into the rotor. However, this is a permanent solution and effectively eliminates the ability to swap out nuts or rapid prototype, that is, if the lead nut is already threaded, inventory must be increased to handle all of the different lead nut/screw combinations. In addition, complicated dies must be used to properly create the lead nut threads to match the lead screw. Material shrinkage must be controlled precisely to prevent poor thread match from nut to screw.

In a second method, adhesives are used to bond the lead nut to the stainless steel rotor inner diameter. However, this method requires a precision interface, additional surface preparation, and cure time. Furthermore, this method has relatively decreased strength and torque capability. As is the case with the first method, the second method is a permanent solution where once the interface is achieved risk of system damage prevents disassembly and continued use of components.

In addition, prior art linear actuators that are constructed as described above suffer from suboptimal load capacity and screws of relatively smaller diameter.

This disclosure describes improvements over these prior art technologies.

SUMMARY

Accordingly, in order to provide an improved linear actuator and to overcome the disadvantages and problems of currently available devices, there is provided a linear actuator system that includes a motor rotor with integrated anti-rotation features inside of the shaft. An injection molded lead nut blank is incorporated within the motor rotor.

A particular advantage of the new and novel lead nut system described herein is the improved assembly and rapid prototyping of a non-captive powered lead screw actuator. Motors can be stocked with hollow shaft and retention feature and can be machined using conventional processes to create lead screw thread.

Another advantage is that the material thickness of the base lead nut is maximized, which in turns increases load capacity and enables the use of larger diameter screws in the system.

Accordingly, a rotor-blank assembly is provided. The rotor-blank assembly includes a rotor including a plurality of rotor anti-rotation features; and a blank having a hollow core and including a plurality of blank anti-rotation features corresponding to the rotor anti-rotation features, wherein the rotor anti-rotation features and the blank anti-rotation features work in conjunction to maintain the blank fixed within the rotor during rotation of the rotor.

Accordingly, a linear actuator assembly is also provided. The linear actuator assembly includes a motor including a rotor having a plurality of rotor anti-rotation features; a blank having a hollow core and including a plurality of blank anti-rotation features corresponding to the rotor anti-rotation features; and a screw fixed within the blank, wherein the rotor anti-rotation features and the blank anti-rotation features work in conjunction to maintain the blank fixed within the rotor during rotation of the rotor.

Accordingly, a method for producing a rotor-blank assembly is also provided. The method includes providing a rotor with a plurality of rotor anti-rotation features; and injection molding a blank within the rotor to produce a blank having a hollow core and including a plurality of blank anti-rotation features that correspond to the rotor anti-rotation features, wherein the rotor anti-rotation features and the blank anti-rotation features work in conjunction to maintain the blank fixed within the rotor during rotation of the rotor.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a" "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

In order to provide an improved linear actuator and to overcome the disadvantages and problems of currently available devices, there is provided a linear actuator system that integrates a lead nut into a motor rotor that maximizes lead nut outside diameter and lead screw diameter. The motor rotor includes integrated anti-rotation features inside of its shaft. The lead nut blank is injection molded into the motor rotor shaft. Preferably, an overmold injection molding process is utilized. The motor defines a hollow shaft with integrated retention features and includes an injection molded plastic lead nut blank. The unthreaded blank can be subsequently threaded to accept a custom screw to meet a customer's need. This process greatly minimizes inventory and allows for faster prototypes. Using a blank allows us to use different diameter screws and different leads and make the decision upon application requirements.

The present disclosure integrates a lead nut inside a motor rotor to create a non-captive (rotating nut) power lead screw actuator. The present disclosure maximizes the lead nut outside diameter which in turn provides greater load capacity and the ability to utilize a larger diameter screw.

Figure 1:
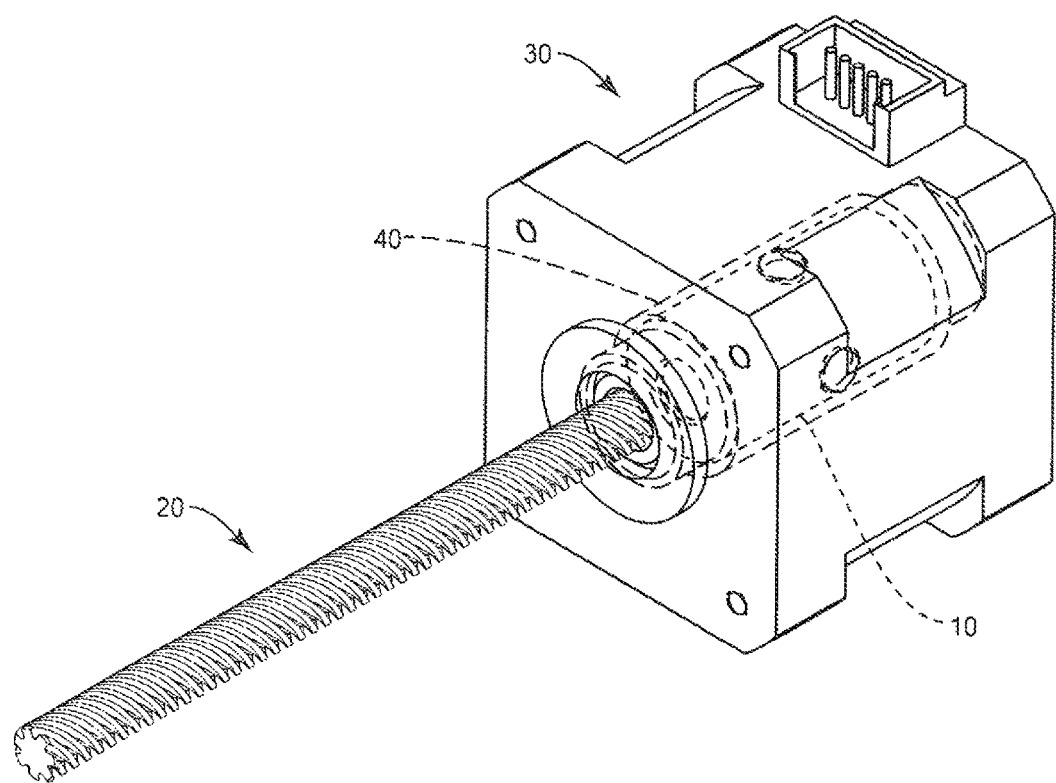
FIG. 1 is a perspective view of a system having an injection molded blank for lead screw in accordance with the present disclosure.
Figure 2:
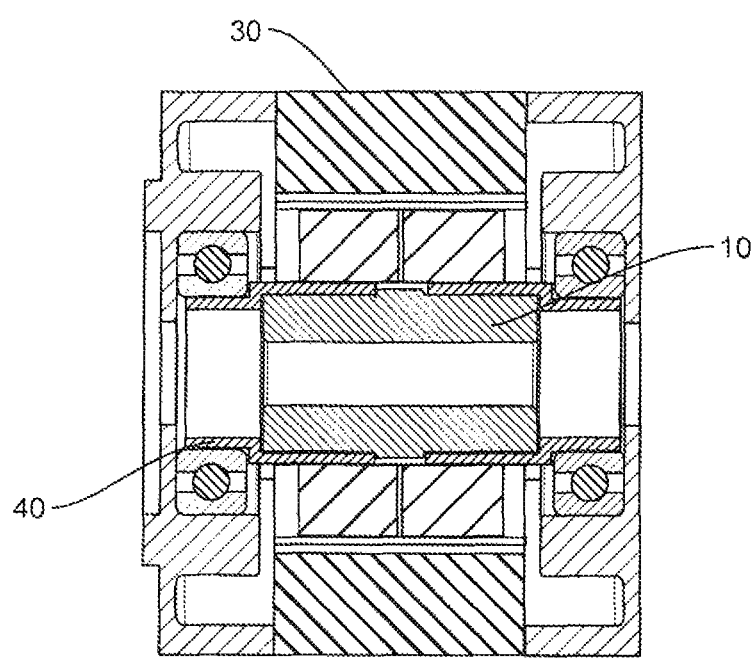
FIG. 2 is a side cross-sectional view of a system having an injection molded blank for lead screw in accordance with the present disclosure.
Figure 3A:
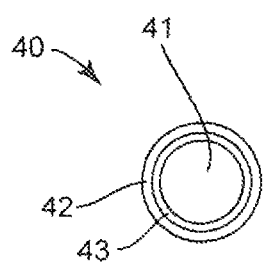
FIG. 3A is a top plan view of a motor rotor in accordance with the present disclosure.
Figure 3B:
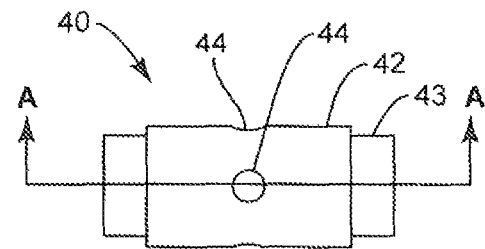
FIG. 3B is a side plan view of a motor rotor in accordance with the present disclosure.
Figure 3C:
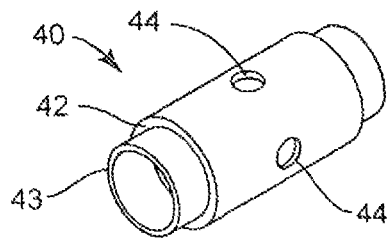
FIG. 3C is a side perspective view of a motor rotor in accordance with the present disclosure.
Figure 3D:
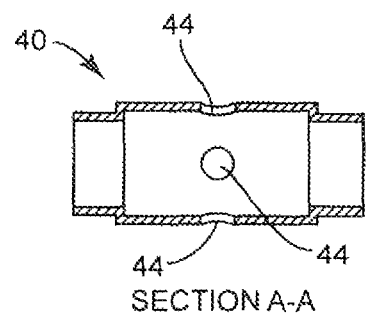
FIG. 3D is a side cross sectional view of a motor rotor in accordance with the present disclosure.
Figure 4A:
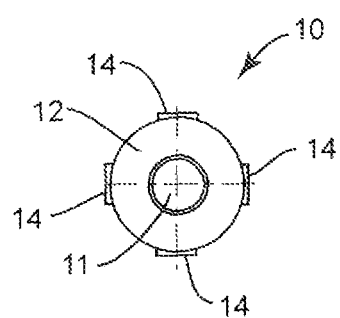
FIG. 4A is a top plan view of an injection molded blank for lead screw in accordance with the present disclosure.
Figure 4B:
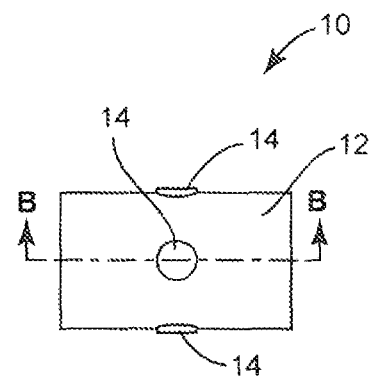
FIG. 4B is a side plan view of an injection molded blank lead screw in accordance with the present disclosure.
Figure 4C:
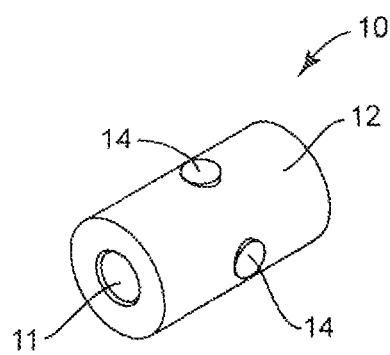
FIG. 4C is a side perspective view of an injection molded blank for lead screw in accordance with the present disclosure.
Figure 4D:
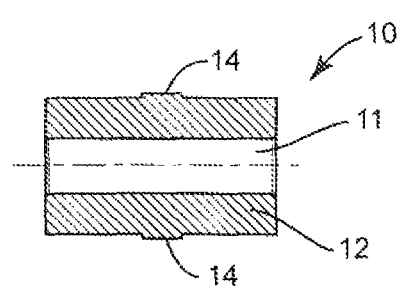
FIG. 4D is a side cross sectional view of an injection molded blank for lead screw in accordance with the present disclosure.

FIGS. 1 and 2 are diagrams illustrating a linear actuator system according to the present disclosure. Shown are blank 10, screw 20, motor 30 and motor rotor 40. Motor 30 causes motor rotor 40 to turn. Blank 10 is situated within motor rotor 40 and turns as motor rotor 40 turns, which in turn causes screw 20 to rotate.

In general, the present disclosure describes a motor constructed with a hollow shaft including an internal pocket located internally between collars 43, which has a larger diameter in body 42 than the thru bore of the collars 43. This pocket restrains axial movement of blank 10. A plastic blank is injection molded into the motor rotor. A blank can be molded as a low precision component and therefore shrinkage is not a concern. Motors can be stocked on a shelf and the lead screw thread can be tapped, single pointed, or produced using other manufacturing methods upon determination of customer desired product.

FIGS. 3A-3D are illustrations of a motor rotor 40 according to the present disclosure. Rotor 40 includes a body 42 and collars 43. The design of rotor 40 is such that it can be rotated by the motor stator while being maintained within the motor. Rotor 40 includes a plurality of rotor anti-rotation features 44 defined about rotor 40. In addition, rotor 40 defines a rotor hollow shaft 41 extending through body 42 and collars 43.

Rotor anti-rotation features 44 are shown as circular orifices. The shapes, sizes and/or positions of the rotor anti-rotation features 44 can vary, for example, the rotor anti-rotation features 44 can be large squares, medium triangles, small circles, or combinations thereof; other shapes, sizes and/or positions are contemplated. What is essential is that the rotor anti-rotation features 44 be designed to maintain blank 10 fixed therein during the rotation of rotor 40. In addition, although rotor anti-rotation features 44 are shown as orifices extending through body 42, designs where rotor anti-rotation features 44 are indentations on the inside of body 42 are also contemplated.

FIGS. 4A-4D are illustrations of a blank 10 according to the present disclosure. Blank 10 includes a body 12 defining a blank hollow shaft 11 there-through. Blank 10 also includes a plurality of blank anti-rotation features 14 defined about blank 10. The shapes, sizes and positions of blank anti-rotation features 14 correspond to the shapes, sizes and positions of rotor anti-rotation features 44 of rotor 40.

A method for producing a rotor-blank assembly will now be described. A rotor 40 is produced having the plurality of rotor anti-rotation features 44. A blank 10 is injection molded into the hollow shaft 41 of the rotor 40. The injection molding of blank 10 produces a plurality of blank anti-rotation features 14 that correspond to the shapes, sizes and positions of the rotor anti-rotation features 44 of the rotor 40. As such, when blank 10 is injection molded into rotor 40, blank anti-rotation features 14 of blank 10 are produced and engage rotor anti-rotation features 44 of rotor 40, thereby enabling rotor 40 to rotate blank 10.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and together with the detailed description, serve to explain the principles of the present invention.

The present disclosure has been described herein in connection with a linear actuator; other applications are contemplated.

Where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A motor rotor-blank assembly for a motor (30), comprising:
   a rotor (40) including a plurality of rotor anti-rotation features (44); and
   a blank (10) having a hollow core (11) and including a plurality of blank anti-rotation features (14) corresponding to the rotor anti-rotation features (44),
   wherein the rotor anti-rotation features (44) and the blank anti-rotation features (14) work in conjunction to maintain the blank (10) fixed within the rotor (40) during rotation of the rotor (40),
   the rotor anti-rotation features (44) are bores through the rotor (40) in a direction substantia perpendicular to a longitudinal axis of the rotor (40) and the blank anti-rotation features (14) are protrusions situated around an outer circumference of the blank (10) to seat in the respective bores (44) through the rotor (40), and
   the rotor (40) has a body (42) axially bounded by end collars (43), with internal diameter of the rotor body (42) larger than internal diameters of the end collars (43), to also restrain axial movement of the blank (10) within the rotor (40).

2. The motor rotor-blank assembly of claim 1, wherein the blank anti-rotation features are produced from molding the blank within the rotor.

3. The motor rotor-blank assembly of claim 1, wherein the blank is molded within the rotor.

4. The motor rotor-blank assembly of claim 3, wherein the blank is injection molded within the rotor.

5. A linear actuator assembly, comprising:
   a motor (30) including a rotor (40) having a plurality of rotor anti-rotation features (44);
   a blank (10) having a hollow core (11) and including a plurality of blank anti-rotation features (14) corresponding to the rotor anti-rotation features (44); and
   wherein the rotor anti-rotation features (44) and the blank anti-rotation features (14) work in conjunction to maintain the blank (10) fixed within the rotor (40) during rotation of the rotor (40),
   the rotor anti-rotation features (44) are bores through the rotor (40) in a direction substantially perpendicular to a longitudinal axis of the rotor (40) and the blank anti-rotation features (14) are protrusions situated around an outer circumference of the blank (10) to seat in the respective bores (44) through the rotor (40), and
   the rotor (40) has a body (42) axially bounded by end collars (43), with internal diameter of the rotor body (42) lamer than internal diameters of the end collars (43), to also restrain axial movement of the blank (10) within the rotor (40).

6. The linear actuator according to claim 5, further comprising a screw fixed within the blank.

7. The linear actuator according to claim 5, wherein the blank anti-rotation features are produced from molding the blank within the rotor.

8. The motor rotor-blank assembly of claim 7, wherein the blank is injection molded within the rotor.

9. A method for producing a rotor-blank assembly for a motor (30), comprising the steps of:
   providing a rotor (40) with a plurality of rotor anti-rotation features (44); and
   positioning a blank (10) within the rotor (40) to produce a blank (10) having a hollow core (11) and including a plurality of blank anti-rotation features (14) that correspond to the rotor anti-rotation features (44),
   wherein the rotor anti-rotation features (44) and the blank anti-rotation features (14) work in conjunction to maintain the blank (10) fixed within the rotor during rotation of the rotor (40),
   the rotor anti-rotation features (44) are bores through the rotor (40) in a direction substantially perpendicular to a longitudinal axis of the rotor (40) and the blank anti-rotation features (14) are protrusions situated around an outer circumference of the blank (10) to seat in the respective bores (44) through the rotor (40), and
   the rotor (40) has a body (42) axially bounded by end collars (43), with internal diameter of the rotor body (42) larger than internal diameters of the end collars (43), to also restrain axial movement of the blank (10) within the rotor (40).

10. The method for producing a rotor-blank assembly for a motor of claim 9, wherein the blank is positioned within the rotor using a molding process.

11. The method for producing a rotor-blank assembly for a motor of claim 9, wherein the blank is injection molded into the rotor.

12. The method for producing a rotor-blank assembly for a motor of claim 9, further comprising threading the blank to accept a screw.

13. The motor-rotor blank assembly of claim 1, wherein external diameter of the rotor body (42) is also larger than external diameters of the end collars (43).

14. The motor-rotor blank assembly of claim 1, wherein an inner surface of the hollow core (11) of the blank (10) is smooth or unthreaded.

15. The motor-rotor blank assembly of claim 1, wherein
   the rotor (40) comprises four bores (44) circumferentially arranged at approximately equidistant angles therethrough, and
   the blank (10) comprises four protrusions (14) arranged at approximately equidistant angles around the outer circumference thereof.

16. The linear actuator according to claim 5, wherein external diameter of the rotor body (42) is also larger than external diameters of the end collars (43).

17. The linear actuator according to claim 5, wherein an inner surface of the hollow core (11) of the blank (10) is smooth or unthreaded.

18. The linear actuator according to claim 5, wherein
   the rotor (40) comprises four bores (44) circumferentially arranged at approximately equidistant angles therethrough, and
   the blank (10) comprises four protrusions (14) arranged at approximately equidistant angles around the outer circumference thereof.

* * * * *